United States Patent
Hein

(10) Patent No.: US 7,627,634 B2
(45) Date of Patent: Dec. 1, 2009

(54) METHOD AND SERVER FOR SYNCHRONIZING REMOTE SYSTEM WITH MASTER SYSTEM

(75) Inventor: Reinhard Hein, Löchgau (DE)

(73) Assignee: Alcatel Lucent, Paris (FR)

( * ) Notice: Subject to any disclaimer, the term of this patent is extended or adjusted under 35 U.S.C. 154(b) by 1290 days.

(21) Appl. No.: 10/697,168

(22) Filed: Oct. 31, 2003

(65) Prior Publication Data

US 2004/0098418 A1 May 20, 2004

(30) Foreign Application Priority Data

Nov. 14, 2002 (EP) .................................. 02360312

(51) Int. Cl.
*G06F 15/16* (2006.01)
(52) U.S. Cl. ........................ 709/206; 709/202; 709/203; 709/248
(58) Field of Classification Search .................. 709/202, 709/203, 206, 248
See application file for complete search history.

(56) References Cited

U.S. PATENT DOCUMENTS

| | | | |
|---|---|---|---|
| 5,729,735 A | 3/1998 | Meyering | |
| 5,926,816 A * | 7/1999 | Bauer et al. | 707/8 |
| 5,978,805 A | 11/1999 | Carson | |
| 6,725,262 B1 * | 4/2004 | Choquier et al. | 709/221 |
| 6,944,623 B2 * | 9/2005 | Kim | 707/102 |
| 7,127,477 B2 * | 10/2006 | Duncombe et al. | 707/203 |
| 2003/0120685 A1 * | 6/2003 | Duncombe et al. | 707/200 |
| 2003/0140050 A1 * | 7/2003 | Li et al. | 707/100 |
| 2003/0212681 A1 * | 11/2003 | Kasper, II | 707/9 |
| 2004/0068523 A1 * | 4/2004 | Keith et al. | 707/200 |
| 2004/0153709 A1 * | 8/2004 | Burton-Krahn | 714/4 |
| 2007/0038703 A1 * | 2/2007 | Tendjoukian et al. | 709/206 |

* cited by examiner

*Primary Examiner*—Nathan Flynn
*Assistant Examiner*—Mohamed Wasel
(74) *Attorney, Agent, or Firm*—Fay Sharpe LLP

(57) ABSTRACT

A method for synchronizing at least one remote system with a master system and a server associated therewith are provided. The server comprises a communication unit for communicating with the master system and with the at least one remote system over a data network. Further, the server comprises a control unit. The control unit detects files to be synchronized that are present in the master system but missing in the at least one remote system. Then, it compares corresponding check sums of files to be synchronized, wherein receiving said check sums from the master system and from at least one remote system. The control unit detects corresponding files with different check sums and initiates the transmission of the detected files from the master system to the at least one remote system.

20 Claims, 4 Drawing Sheets

METHOD AND SERVER FOR SYNCHRONIZING REMOTE SYSTEM WITH MASTER SYSTEM

BACKGROUND OF THE INVENTION

The invention is based on a priority application EP 02 360 312.9 which is hereby incorporated by reference.

The present invention relates to a method for synchronizing at least one remote system with a master system, wherein files to be updated are sent over a data network connecting the master system with the at least one remote system, and to a server for synchronizing at least one remote system with a master system.

Today systems providing functions for telecommunication services are more and more distributed all over the telecommunication network. An update of these systems often means replication of a master software in different systems. Due to the big amount of data, such master files are normally copied on compact disks and shipped to the different locations. There, the data is loaded into the corresponding memory of the local telecommunication system.

Further, computer systems are known which synchronize data stored in multiple remote data base files with data stored in a master data base file. Several approaches are known to solve the problem that unsynchronized copies of data base files can cause errors. Different users can get different results from an identical inquiry of the data base.

According to one approach, all computers that store copies of a data base file are continuously interconnected and the various copies of the file are continuously synchronized. But, such a continuous interconnection is generally too expensive and decreases the system efficiency.

According to a further approach, the users mark changes in their respective copies. A manual procedure periodically updates a master data base file from each of the users marked-up copies. The procedure is time-consuming and high error-prone.

According to a further approach, the system creates for each remote file an associated backup file. The system creates a remote file by copying data from the master file. The backup file reflects content of the remote file when the remote file was created or last synchronized. From time to time the system synchronizes data in the master file and the remote files by comparing which of the files, the remote file or the master file, has the more current version of the data. The system then updates the file that has the less current data with data from the file that has the more current data. After synchronizing the files, the system copies all data from the remote file to the backup file.

But, all these approaches are not applicable to the above described problem in the field of communication systems due to the big amount of data which has to be replicated and due to the complex development chain of master software.

It is an object of the present invention to improve the synchronization of at least one remote system with a master system.

SUMMARY OF THE INVENTION

The object of the present invention is achieved by a method for synchronizing at least one remote system with a master system, wherein the method comprising the steps of: detecting files that are present in the master system, but missing in the at least one remote system; sending check sums calculated for corresponding files to be synchronized to a comparison server; detecting files with different check sums; initiating the transmission of said detected files from the master system to the at least one remote system; and sending files to be updated over a data network connecting the master system with at least one remote system. The object of the present invention is further achieved by a server for synchronizing at least one remote server with a master system, the server comprising: a communication unit for communicating with the master system and with the at least one remote system over a data network; and a control unit for: detecting files to be synchronized that are present in the master system, but missing in the at least one remote system; comparing corresponding check sums of files to be synchronized, wherein receiving said check sums from the master system and from the at least one remote system; detecting corresponding files with different check sums; and initiating the transmission of said detected files from the master system to the at least one remote system.

Several advantages are achieved by this invention: The time needed to replicate a master software in different system is reduced drastically. Further, the amount of data which has to be exchanged over a data network is reduced to a level, which can be handled by existing systems in a efficient way. This leads to cost-savings compared with existing methods. Further, low investments are needed to upgrade existing systems, existing infrastructure and protocols can be reused to implement the invention.

The invention is not limited to telecommunication systems, but is also applicable to all other kind of computer systems.

Further advantages are achieved by the embodiments indicated by the dependent claims.

According to a preferred embodiment of the invention, the control unit deletes files that are present in the at least one remote system but missing in the master system.

Further, the control unit may initiate the adjustment of file attributes of files to be synchronized. Adjusted file attributes are, for example, access rights, owner of file or file group. The control unit determines files that are present in the remote system and in the master system but have different file attributes. Then, it adapts the file attributes of the remote system to the file attributes of the master system. Further, the control unit may also adjust symbolic links and/or hard links.

These features increase the scope and applicability of the service provided by the server. Further, it saves memory space in the remote systems.

The flexibility of the whole system is increased, if the control unit assigns master system and remote system roles to computer systems based on a message received from a control station. Thereby, the replication process can be adapted easily on present system demands.

According to a further preferred embodiment of the invention, the control unit sends commands to the master system and to the at least one remote system, wherein the commands contain a file classification specifying a group of files to be updated, and the control unit requests from the master system and from the at least one remote system to reply a list of files complying with this file classification. This leads to a further reduction of data which has to be exchanged over the data network. Consequently, further cost-savings and gains of processing time are achieved.

Further advantages are achieved by the following: The control unit receives from the master system and from the at least one remote system a respective list of files to be updated. The control unit compares the received lists and filters out identical files. Then, the control unit sends to the master system and to the at least one remote system a list of files that are filtered out and requests the calculation of check sums from these files. This concept leads to further savings of processing time of the master systems and of the remote systems. Further, the amount of data which has to be exchanged over the data network is reduced.

Further advantages are achieved by the following: The control unit requests from the file systems of the master system and the at least one remote system to block the access to files to be updated until the data synchronization is finalized. Further, the control unit may allocate the files to be updated to several file blocks and performing the data synchronization of each of said file blocks separately. Due to the allocation of files to file blocks it becomes possible to at least partly run the remote system during data synchronization.

These features might be used to prevent the risk of data inconsistencies caused by data synchronization.

According to a further embodiment of the invention, the control unit requests from the file system of the at least one remote system to check for data inconsistencies caused by the data synchronization and to reply a list of inconsistent files. When it receives lists of inconsistent files, it performs again the data synchronization, now for the files of these lists. This makes it possible to avoid data inconsistency caused by data synchronization and enables to run the remote systems during data synchronization.

In particular, it is advantageous to apply the above described concepts to the synchronization of telecommunication systems and to the synchronization of systems with real time requirements.

BRIEF DESCRIPTION OF THE DRAWINGS

These as well as other features and advantages of the invention will be better appreciated by reading the following detailed description of presently preferred exemplary embodiment taken in conjunction with companying drawings of which:

FIG. 1 shows for computer systems 1 to 4, a server 6, a control station 7 and a communication network 5.

Figure 1:
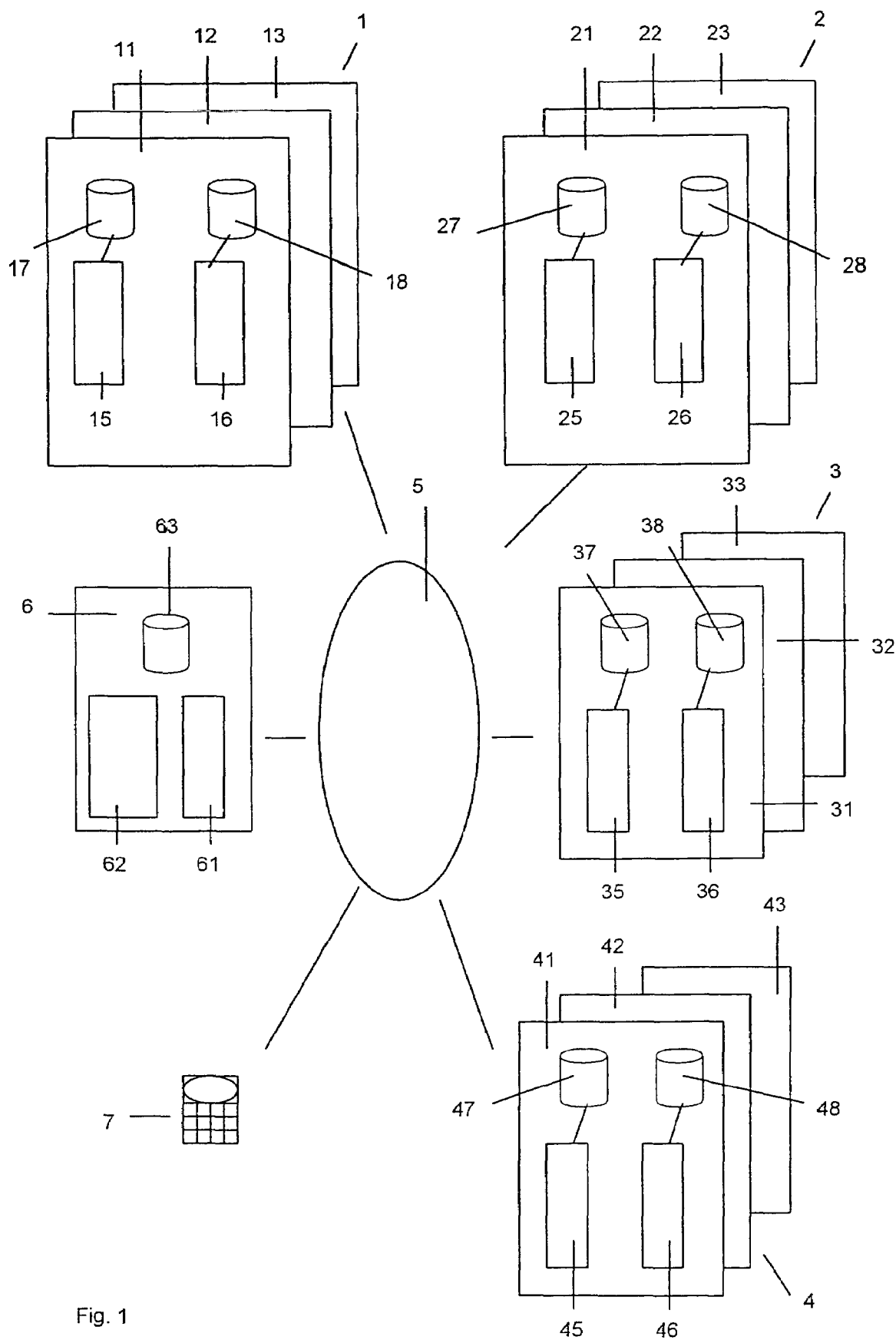
FIG. 1 is a block diagram which shows a system with a master system, several remote systems and a server according to the invention.

The communication network 5 is a data network which enables data transfer between the computer systems 1 to 4, the server 6 and the control station 7. Preferably, the communication network 5 is an IP-network (IP=Internet Protocol). This kind of network uses the IP-protocol as level 3 protocol. From the physical point of view, the communication network 5 can be formed by a plurality of sub-networks which may be assigned to different network operators and which may base on different technologies.

For example, the communication network 5 is formed by an ATM-backbone network (ATM=Asynchronous Transfer Mode) and several LAN-networks (LAN=Local Area Network), for example, basing on an ETHERNET MAC-protocol (MAC=Media Access Protocol). Further, the communication network 5 can be formed by a plurality of synchronous channels established through a traditional telecommunication network and interconnecting the computer system 1 to 4, the server 6 and the control station 7.

The computer systems 1 to 4 are telecommunication systems. The computer system 1 is a test-installation located in a test center of a technology supplier. The computer systems 2 to 4 are active telecommunication systems which are permanently in an operation mode and permanently perform telecommunication services within a telecommunication network (not show). The computer systems 1 to 4 are, for example, exchanges, network nodes, network management system components, service management system components, network service servers, for example IN SCP-nodes (IN=Intelligent Network; SCP=Service Control Point), or Internet- or Web-service servers.

But, it is also possible that the computer systems 1 to 4 perform other kind of tasks.

The computer systems 1 to 4 consist of several sub-systems 11 to 13, 21 to 23, 31 to 33 and 41 to 43, respectively. Each of these sub-systems performs different functionalities. Further, each of these sub-systems contains two parallel systems to increase reliability and safety of the whole system. The systems are doubled, from the hardware point of view as well as from the software point of view.

From the functional point of view, the sub-system 11 comprises two control units 15 and 16 and associated file-systems 17 and 18, respectively. The file-systems 17 and 18 manage all the data and program code of the sub-system 11. Even, the sub-systems 21, 31 and 41 have the same architecture and comprise control-units 25 and 26, 35 and 36 and 45 and 46 and file-systems 27 and 28, 37 and 38 and 47 and 48, respectively.

But, the invention is not limited to such kind of architecture. The system architecture depends on the computer system the invention is applied on.

The control unit 7 is a normal computer, for example a PC which is connected with the communication network 5.

The server 6 is formed by one or several interconnected computers, a software platform established on this hardware platform and a plurality of application programs running on this system platform. The functions of the server 6 as described in the following are performed by the execution of application software programs on the system platform of the server 6.

From functional point of view, the server 6 contains a communication unit 61, a control unit 62 and a file system 63.

The communication unit 61 performs necessary communication services for communicating with the computer systems 1 to 4. For example, it comprises the necessary functionalities to provide the TCP/IP protocol stack (IP=Internet Protocol; TCP=Transmission Control Protocol).

The control unit 62 performs following functions:

It detects files to be synchronized that are present in the master system but missing in the at least one remote system. The assignment of the master system and remote system roles is flexible. There can be one remote system, but also a plurality of remote systems. According to the embodiment of FIG. 1, the computer system 1 plays the master system role and the computer systems 2 to 4 play remote system roles.

The control unit 62 receives check sums from the master system and from the at least one remote system. These check sums are calculated by the sending system for corresponding files which has to be synchronized. The control unit 62 compares the received corresponding check sums. For example, it receives four check sums, each from one of the computer systems 1, 2, 3 and 4. Each of these four check sums is associated to the specific file which has to be updated. The control unit 62 compares the check sum received from the computer system 1 with each of the check sums received from the computer systems 2 to 4. Then, it detects corresponding files with different check sums by help of this comparison.

For example, it detects that the check sums received from the computer systems 1 and 2 for the specific file are identical, but that the check sums received from the computer systems 1 and 3 for the specific file are different.

If the control unit 62 detects corresponding files with different check sums, it initiate the transmission of the detected files from the master system to that remote system, which contains a corresponding file with a different check sum.

Figure 2:
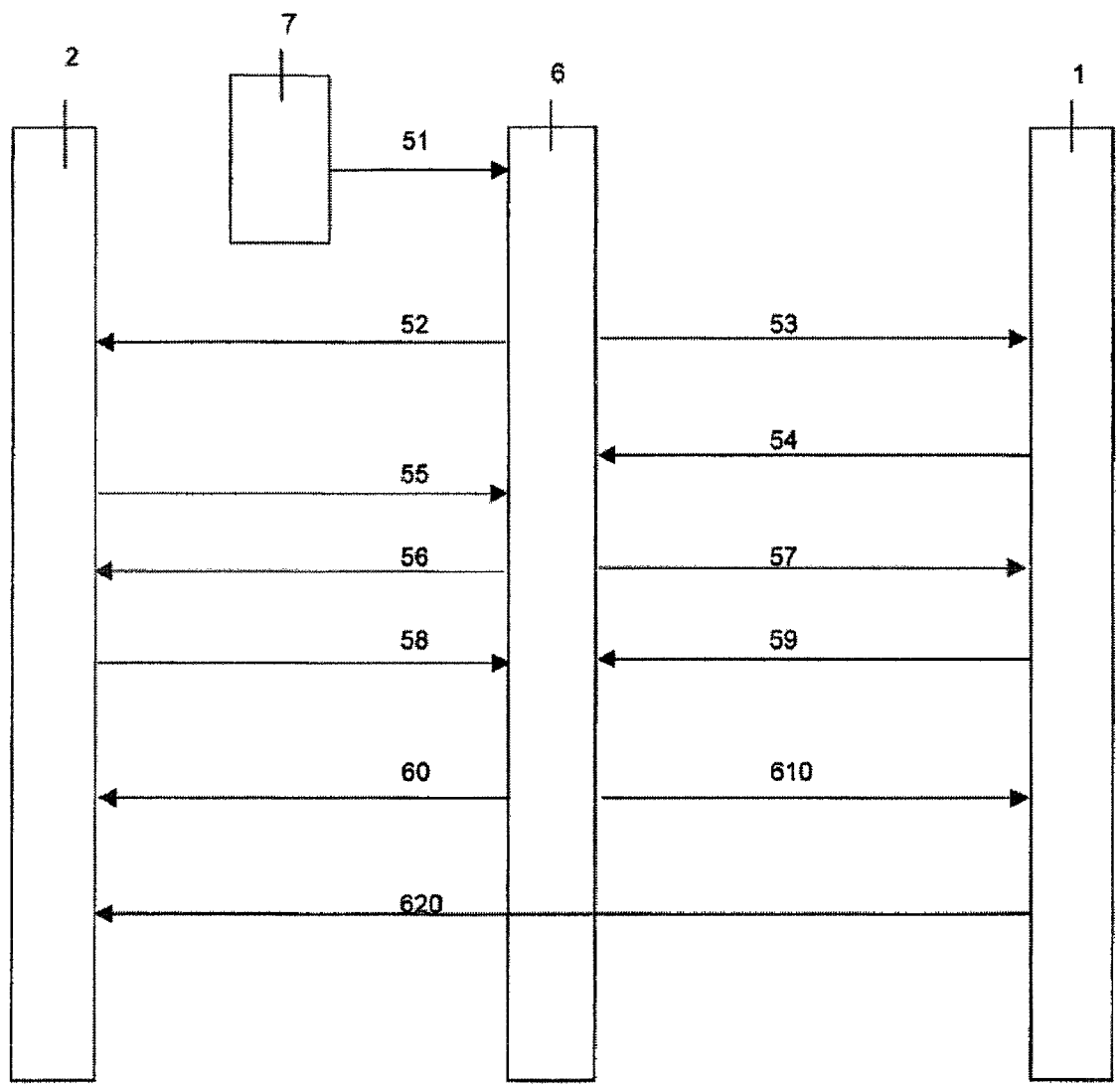
FIG. 2 is a flow diagram showing the communication between the server, the master system and one of the remote systems of FIG. 1.

The detail functionality of the control unit 62 is now described by hand of FIG. 2:

FIG. 2 shows a flow diagram representing the communication between the server 6, the computer systems 1 and 2 and the control station 7. It shows messages 51 to 60, 610, and 620 which are exchange between the server 6, the computer systems 1 and 2 and the control station 7.

The control station 7 sends the control message 51 over the communication network 5 to the server 6. The control message 51 specifies which of the computer systems 1 to 4 is the master system and which of the computers systems 1 to 4 are associated remote systems. For example, the control message 51 assigns to the computer system 1 the master system role and to the computer system 2 the remote system role.

Further, the command message 51 specifies the group of files which have to be updated.

For example, it comprises a description or specification parameters that specifies these files. Further, additional information as data structures, exceptions etc. may be specified by the command message 51.

The control unit 62 determines a file classification specifying the group of files defined by the command message 51. For performing this function, the control unit 62 accesses information about the data structure of the file systems of the master system and the remote system. This information can be stored in the file system 63, but is also possible that the control unit 62 requests this information from the computer systems 1 to 4.

The file classification describes the parts of the data structure of the file systems of the computer systems 1 and 2 which should be synchronized. The file classification may contain one or several criteria. Criteria may be connected (e.g. by logical operators). Criteria are, for example, file name, file path, file extension etc. Further, it is possible that the file classification selects all files of the file system.

It is possible that the computer systems 1 and 2 have different data structures and that the control unit 62 respects these differences within its calculation.

According to the details of the calculation of file classification, the command message 51 may be replaced by a plurality of messages exchanged between the server 6, the control station 7 and the computer systems 1 to 4.

The control unit 62 requests from the master system and from the remote system to reply a list of files complying with the file classification. It initiate the sending of the command messages 52 and 53 to the computer systems 1 and 2 which requests from these systems to reply a list of files complying with the calculated file classification.

It is possible that the file classification specifies which of the sub-systems 11 to 13 and 21 to 23 has to be updated and that the file classification specifies whether both parallel systems 17, 18, 27 and 28 has to be updated.

The systems 1 and 2 determine the files complying with the received file classification. Further, the systems 1 and 2 determine one or several file attributes of each file complying with the received file classification. The number and kind of file attributes determined by the systems 1 and 2 may be specified by the control unit 62, for example as part of the file classification transferred within the messages 52 and 53. But, it is also possible that the systems 1 and 2 determine a predetermined range of file attributes for each file complying with the file classification. Further, it is possible that the number and kind of determined parameters vary from file to file and depend on the kind of determined file.

File attributes describes the characteristics of a file. File attributes are, for example, file name, size of the file, owner of the file, user group, access rights etc.

For example, the control unit 15 scans the file system 17 and filters out file attributes of the files which comply with the received file classification. Filtered file attributes are access rights, owner, group, iNode and link counter.

The same is done by the control unit 16 which filters out files of the file system 18 that comply with the received file classification.

But, it is also possible that the messages 52 and 53 do already contain a complete list of files to be updated, for example specified by their respective file name, which is used by the computer systems 1 and 2 to filter out files complying with the files of this list.

Further, it is possible that this file list is not calculated by the server 6 but received within the control message 51, inputted by an operator or predefined in the remote systems and in the master system.

Having performed this selection and filter step, the computer systems 1 and 2 reply a list of files complying with the file classification specified by the messages 52 and 53. Each of these lists of files comprises the filtered file attributes of the files of the respective remote file system that comply with the file classification. These lists of files are transported as part of the messages 54 and 55 over the data network 5 to the server 6.

The received lists of files represent the files of the computer systems 1 and 2 which have to be updated. The received lists are compared by the control unit 62. For example, the control unit 62 creates a list with three rows, wherein the first row identifies the file, the second row identifies whether this file is available in the computer system 1 and the third row identifies whether this file is available in the computer system 2. When comparing the received lists, the control unit 62 filters out identical files, that mean files which are available in both systems, in the master system 1 and in the remote system 2.

Identifications of these identical files may be stored in a first file list. The first file list represents files for which check sums has to be calculated.

Further, it is possible that the control unit 62 creates one, several or all of the following further file lists: a list of files that has to be deleted in the remote system; a list of files, where the access rights of these files has to be amended in the remote system; a list of files, where the group assignment of theses files has to be amended in the remote system; a list of files, where the symbolic links of these files has to be processed; and a list of files, where the hard links of these files has to be processed.

The control unit 62 calculates the content of these lists by comparing the file attributes of the above described lists received from the master system and the remote systems.

Then, the control unit 62 sends the messages 56 and 57 to the computer system 1 and 2, respectively. The messages 56 and 57 request the calculation of check sums for a number of files specified in the messages 56 and 57. The files specified by the messages 56 and 57 are the files which are filtered out by the above described process.

When receiving the messages 56 and 57, the systems 1 and 2 start the calculation of check sums for the files specified in the messages 56 and 57, respectively. The check sum calculation is performed by a 32 bit cyclic redundancy code algorithm (CRC).

Further, it is possible to use one of the following algorithms for check sum calculation: ADLER32, BSD sum, POSIX cksum, CRC-16, MD2, MD5, SHA and Unix system V sum.

The calculated check sums are sent back to the server 6. The computer systems 1 and 2 reply messages 59 and 58 which contain a list of files and corresponding calculated check sums. The server 6 compares, one after the other, the corresponding check sums received from the computer systems 1 and 2.

If more than one remote system is associated to a master system, this check sum comparison is done separately for each master-remote system relation.

For example, the control unit 62 creates in the file system 63 a list with four rows, the first row identifies files, the second row identifies whether the file is available in the master system, the third row identifies whether the file is available in the remote system and the fourth row identifies whether the check sums received from the master system and from the remote system are a different or equal. Then, it determines the files by help of this list, which are present in the master system but missing in the remote system, or which have different check sums.

A list of the such detected files is transported by the message 610 to the computer system 1, which is the master system. The message 610 requests from the computer system 1 to send a message to the remote system 2, which contains the content of the files specified in the message.

When receiving the message 610, the computer system 1 produce copies of the specified files and transmit these copies, as message 620, over the data network 5 to the computer system 2.

Further, the control unit 62 determines, by help of the above described list created in the file system 63, the files which are present in the remote system but missing in the master system. The control unit 62 sends a list of these files to the computer system 2. The message 60 requests from the computer system 2 to delete the files, which are specified in the accompanying list.

Further, it is possible that the control unit further requests from the remote computer system 2 to perform the necessary actions for the files specified in the above described further lists. For example, it requests the change of access rights on files, the change of the owner and/or the group file attributes of files, the adaptation of symbolic links and/or hard links of files, etc.

The computer system 2 replaces the files described in the message 620 with the files contained in the message 620. Further, it deletes the files described in the message 60.

Figure 3:
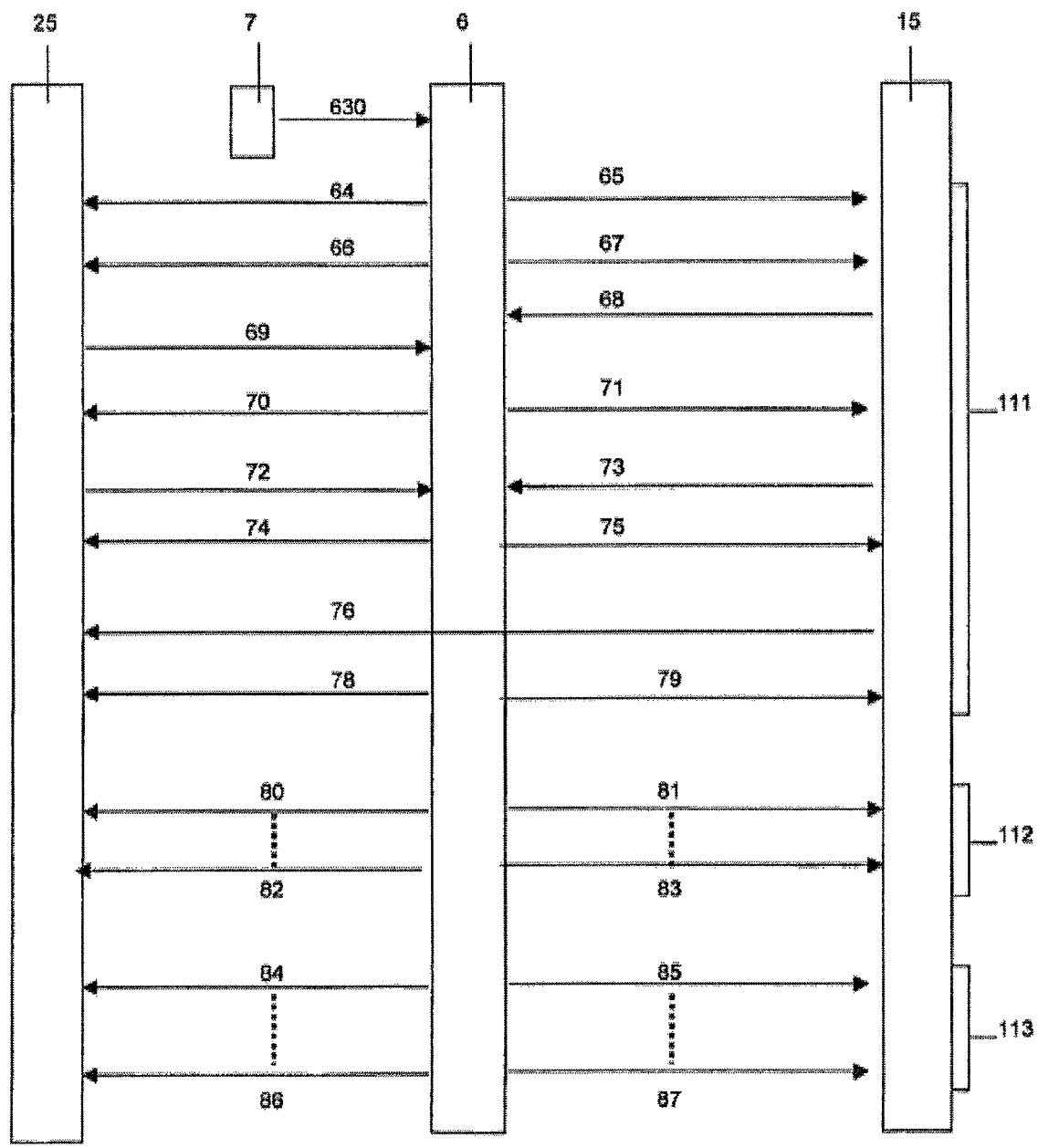
FIG. 3 is a flow diagram showing the communication between the server, the master system and one of the remote systems of FIG. 1.

A further embodiment of the invention is now described by hand of FIG. 3. This embodiment respects the constraint that data inconsistencies which might be caused due to data synchronization should be prevented.

FIG. 3 shows a flow diagram representing the communication between the server 6, the control station 7, the control unit 15 and the control unit 25. Further, it shows a plurality of messages 630 and 64 to 87 exchanged between the computer systems 1 and 2, the server 6 and the control station 7 over the data network 5.

The message 630 corresponds with the message 51 of FIG. 2.

In addition to the calculation of the file classification, the control unit 62 allocates files to be updated to a number of file blocks. For example, it allocated file classification to three different file blocks. The allocation mainly respects dependencies and relation between files and intends to group dependent files. For performing this allocation, the control unit 62 accesses data describing the data structure of the computer systems 1 and 2. In the following, it performs the data synchronization of each of these blocks separately.

For example, it performs a data synchronization 111 for the first block, then it performs a data synchronization 112 for the second block and then it performs a data synchronization 113 for the third block.

With respect to the first data synchronization 111, it sends the messages 64 and 65 to the control units 15 and 25. The messages 64 and 65 requests from the control units 15 and 25 to block the access to files of the block to be updated until the data synchronization 111 is finalized. The messages 64 and 65 contain a respective file classification identifying the files of the first file block.

Then, messages 66 to 76 are exchanged between the server 6 and the control units 25 and 15 which perform the data synchronization of the files of the first block in accordance with the procedure described by hand of FIG. 2.

Then, the control unit 62 sends the messages 78 and 79 to the control unit 15 and 25 which indicate the finalization of the data synchronization and request the de-blocking of the updated files.

In the following, the control unit 62 performs the same procedure for the data synchronization 112 and 113:

Messages 80, 81, 84 and 85 are sent to the control units 25 and 15 which requests to block the access to files to be updated until the data synchronization is finalized. After finalization of the data synchronizations 112 and 113, the messages 82, 83, 86 and 87 are sent to the control units 15 and 25 which indicate the finalization of the data synchronization and request a de-blocking of the respective files.

In the following, further embodiments of the invention are described by hand of FIG. 4. These embodiment respects the requirement to avoid blockings of the system 1 to 4 and nevertheless avoid inconsistencies caused by data synchronization.

Figure 4:
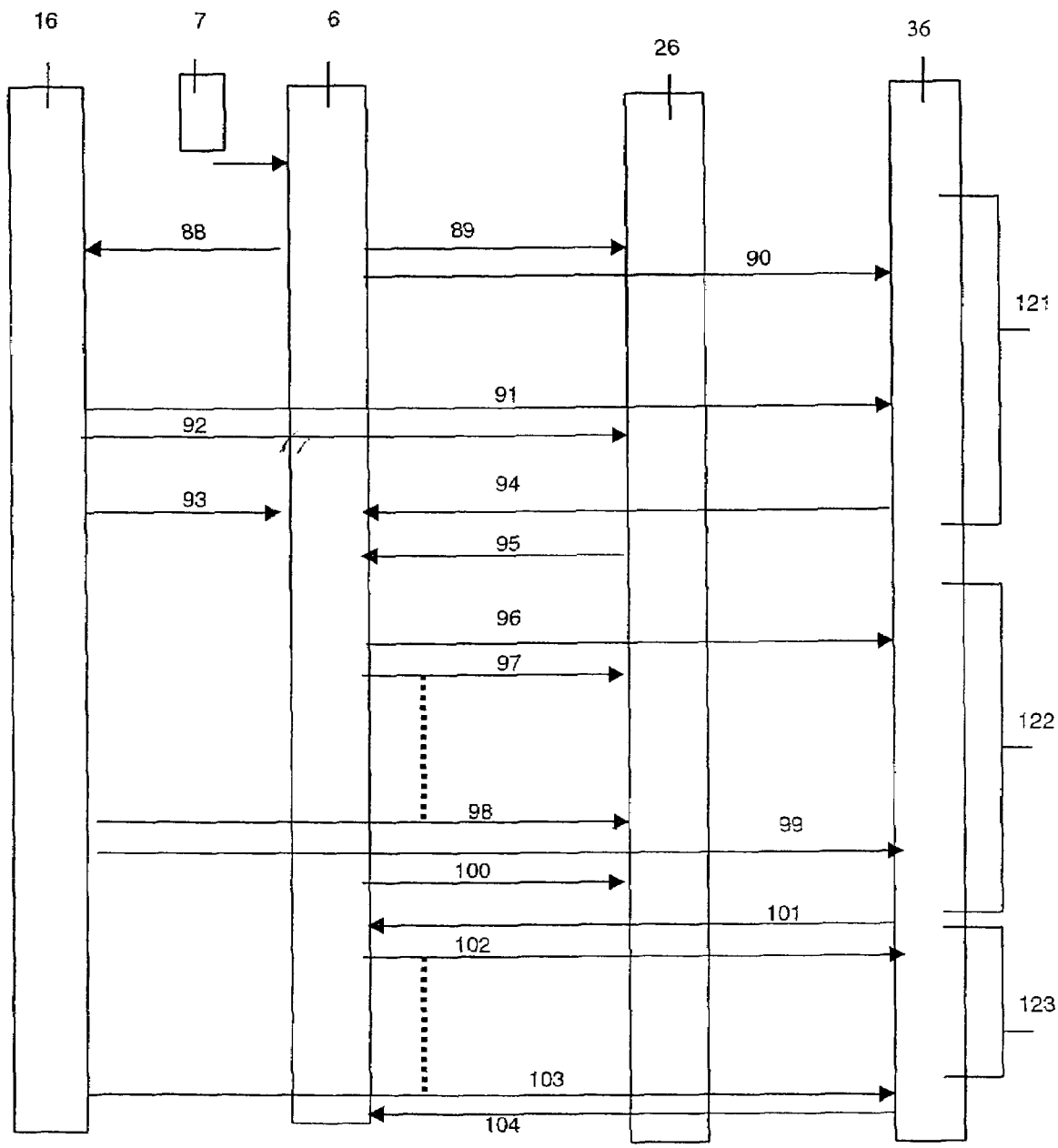
FIG. 4 is a block diagram showing the communication between the server, the master system and two of the remote systems of FIG. 1.

FIG. 4 shows a flow diagram representing the communication between the server 6, the control units 16, 26 and 36 and the control station 7. Messages 88 to 104 are exchanged between the server 6, the control station 7 and the control units 16, 26 and 36 over the data network 5. These messages are associated to three data synchronizations 121, 122 and 123.

The embodiment described in the following avoids an allocation of files to file blocks, but it is also possible to combine the procedure according to FIG. 4 with the procedure according to FIG. 3.

After having calculated the file classification, the messages 88 to 90 are sent from the control unit 62 to the control units 16, 26 and 36, respectively. The messages 88 to 90 request from the file systems of the computer systems 1 to 3 to check for data inconsistencies caused by data synchronization. For example, the messages 88 to 90 contain a respective file classification and the control units 16, 26 and 36 requests from the file systems 18, 28 and 38 to check for data inconsistency of the files specified by the file classification. Data inconsistencies are checked, for example, by help of log files or by transaction mechanisms.

At the end of data synchronization, which is done according to FIG. 2, new data file contents are transmitted by the messages 91 and 92 from the master system 1 to the remote systems 2 and 3. The file systems 28 and 38 check whether data inconsistencies are caused, if files are replaced by file content received by the messages 91 and 92, respectively. The results of this check are submitted by the messages 93 to 95 to the control unit 62. The messages 93 to 95 comprise a respective list of files marked as inconsistent.

For example, the control unit 62 receives a first list of inconsistent files from the control unit 26 and a second list of inconsistent files from the control unit 36. The control unit 62 starts a new data synchronization 122 for files marked as inconsistent files. With respect to the remote system 2, it starts such data synchronization for files marked as inconsistent in the first list and for the remote system 3 it starts such data synchronization for the files marked as inconsistent in the second list.

Two different strategies are applied on the master-remote system relation between the computer systems 1 and 2 and between the computer systems 1 and 3 in the following:

The message 97 sent from the server 6 to the control unit 26 is a blocking message which requests to block the access to the files of the first list. This procedure is, for example, described in accordance with FIG. 3.

The message 96 requests to check for data inconsistencies of files of the second list caused by data synchronization. With respect to the computer system 3, the second data synchronization 122 follows the same strategy as the first data synchronization 121.

The messages 98 and 99 submit the content of the files, which has to be updated, from the master system to the respective remote systems 2 and 3. The message 100 is a de-blocking message as known from the embodiment according to FIG. 3. The message 101 is the same kind of message as the message 94, it contains a list of still inconsistent files.

In the following, the control unit 62 starts again a data synchronization 123 for the files specified in the message 101. It sends the message 102, which requests the check for data inconsistency for the files of the message 101. The message 103 submits the content of the file to be updated to the control unit 36. The message 104 indicates that no further data inconsistency's are monitored.

Having received the message 104, the whole data synchronization is finalized and the control unit 62 stops to initiate further data synchronizations.

The invention claimed is:

1. A server for synchronizing at least one remote system with a master system, said server comprising:
    a communication unit for communicating with the master system and with the at least one remote system over a data network; and
    a control unit for:
        receiving from the master system and the at least one remote system respective first lists of files that comply with a file classification specifying a group of files to be updated;
        detecting files in the first lists of files that are present in the master system, but missing in the at least one remote system;
        comparing the first lists of files and filtering out files that are in multiple first lists of files to form a second list of files;
        sending the second list of files to the master system and the at least one remote system and requesting respective calculations of check sums for corresponding files in the master system and the at least one remote system;
        receiving said respective check sums from the master system and the at least one remote system;
        comparing corresponding check sums for the files in the second list of files;
        detecting files from the second list of files with different check sums; and
        initiating the transmission of files to be synchronized from the master system to the at least one remote system, wherein the files to be synchronized include files from the second list of files for which different check sums were detected and files from the first lists of files which were detected as missing from the at least one remote system.

2. The server according to claim 1, wherein the control unit is arranged to delete files to be synchronized that are present in the at least one remote system but missing in the master system.

3. The server according to claim 1, wherein the control unit is arranged to initiate the adjustment of file attributes of files to be synchronized and/or to initiate the adjustment of symbolic links and/or hard links.

4. The server according to claim 1, wherein the control unit is arranged to assign master system and remote system roles to computer systems based on a message received from a control station.

5. The server according to claim 1, wherein the control unit is arranged to send commands to the master system and to the at least one remote system, the commands including the file classification specifying the group of files to be updated and a request to reply with the corresponding first list of files complying with this file classification.

6. The server according to claim 1, wherein the control unit is arranged to request the file systems of the master system and the at least one remote system to block the access to files to be updated until the data synchronization is finalized.

7. The server according to claim 1, wherein the control unit is arranged to allocate the files to be updated to several file blocks and performing the data synchronization of each of said file blocks separately.

8. The server according to claim 1, wherein the control unit is arranged for:
    requesting the file systems of the at least one remote system to check for data inconsistency caused by the data synchronization and to reply with a list of inconsistent files; and
    performing again the data synchronization for the files of this list.

9. The server according to claim 1, wherein the control unit is arranged to receive a control message from a control station, the message including the file classification, and to send commands to the master system and the at least one remote system, the commands including the file classification.

10. A method for synchronizing at least one remote system with a master system, wherein files to be updated are sent over a data network connecting the master system with the at least one remote system, the method comprising the steps of:
    receiving, at a comparison server, from the master system and the at least one remote system respective first lists of files that comply with a file classification specifying a group of files to be updated;
    detecting files in the first lists of files that are present in the master system, but missing in the at least one remote system;
    comparing the first lists of files and filtering out files that are in multiple first lists of files to form a second list of files;
    sending the second list of files to the master system and the at least one remote system and requesting respective calculations of check sums for corresponding files in the master system and the at least one remote system;

receiving, at the comparison server, said respective check sums from the master system and the at least one remote system;

comparing corresponding check sums for the files in the second list of files;

detecting files from the second list of files with different check sums; and initiating the transmission of files to be updated from the master system to the at least one remote system, wherein the files to be updated include files from the second list of files for which different check sums were detected and files from the first lists of files which were detected as missing from the at least one remote system.

11. The method according to claim 10, further comprising:

deleting files to be synchronized that are present in the at least one remote system but missing in the master system.

12. The method according to claim 10, further comprising:

initiating the adjustment of file attributes of files to be synchronized and/or to initiate the adjustment of symbolic links and/or hard links.

13. The method according to claim 10, further comprising:

assigning master system and remote system roles to computer systems based on a message received from a control station.

14. The method according to claim 10, further comprising:

sending commands to the master system and to the at least one remote system, the commands including the file classification specifying the group of files to be updated and a request to reply with the corresponding first list of files complying with this file classification.

15. The method according to claim 10, further comprising:

requesting the file systems of the master system and the at least one remote system to block the access to files to be updated until the data synchronization is finalized.

16. The method according to claim 10, further comprising:

allocating the files to be updated to several file blocks and performing the data synchronization of each of said file blocks separately.

17. The method according to claim 10, further comprising:

requesting the file systems of the at least one remote system to check for data inconsistency caused by the data synchronization and to reply with list of inconsistent files; and performing again the data synchronization for the files of this list.

18. A method for synchronizing files on a remote system with files on a master system via a data network, the method comprising:

a) at a comparison server, receiving respective first lists of files from the master system and the remote system, both first lists of files complying with a file classification specifying a group of files to be updated;

b) identifying files in the first lists of files that are present in the master system, but missing in the remote system;

c) comparing the first lists of files and filtering out files that are in both first lists of files to form a second list of files;

d) sending the second list of files to the master system and the remote system and requesting respective calculations of check sums for corresponding files in the master system and the remote system;

e) at the comparison server, receiving said respective check sums from the master system and the remote system;

f) comparing corresponding check sums for the files in the second list of files;

g) identifying files from the second list of files with different check sums; and h) initiating the transmission of the files identified in b) and g) from the master system to the remote system.

19. The method according to claim 18, further comprising:

i) receiving a control message from a control station, the message including the file classification; and j) sending commands to the master system and the remote system, the commands including the file classification.

20. The method according to claim 19, wherein the file classification includes at least one of a file name, a file path, a file extension, a selection of all files, a file system, a file attribute, a file size, a file owner, a user group, and an access right.

* * * * *

UNITED STATES PATENT AND TRADEMARK OFFICE
CERTIFICATE OF CORRECTION

PATENT NO. : 7,627,634 B2  Page 1 of 1
APPLICATION NO. : 10/697168
DATED : December 1, 2009
INVENTOR(S) : Reinhard Hein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1643 days.

Signed and Sealed this

Twenty-first Day of December, 2010

David J. Kappos
*Director of the United States Patent and Trademark Office*